L. W. THOMPSON.
AUTOMATIC REGULATING SYSTEM.
APPLICATION FILED OCT. 25, 1919.
1,365,566.      Patented Jan. 11, 1921.
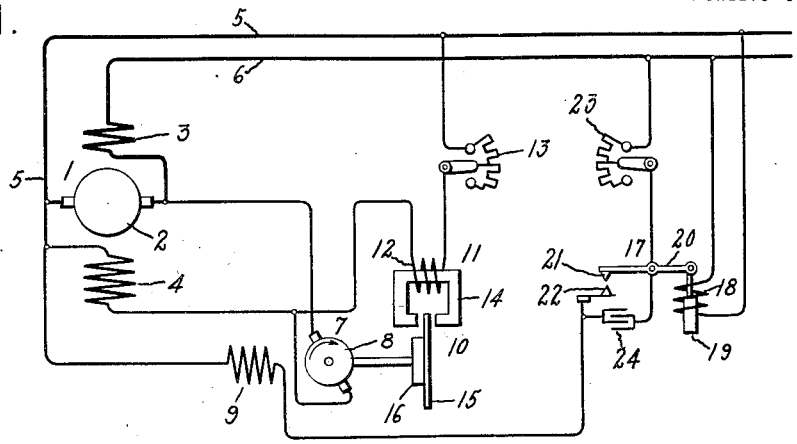
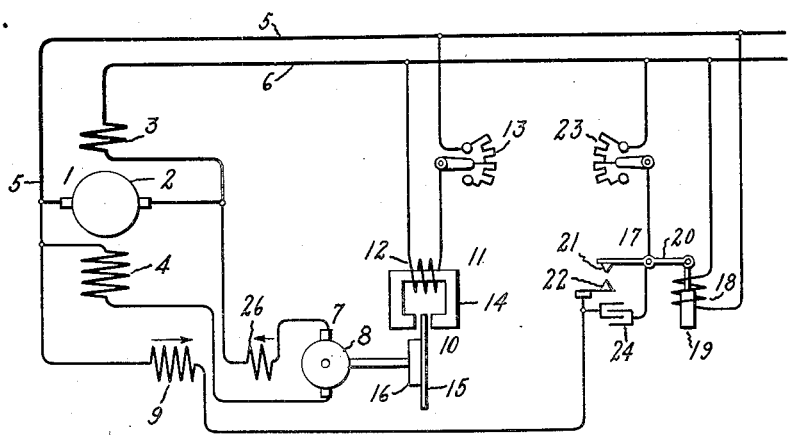
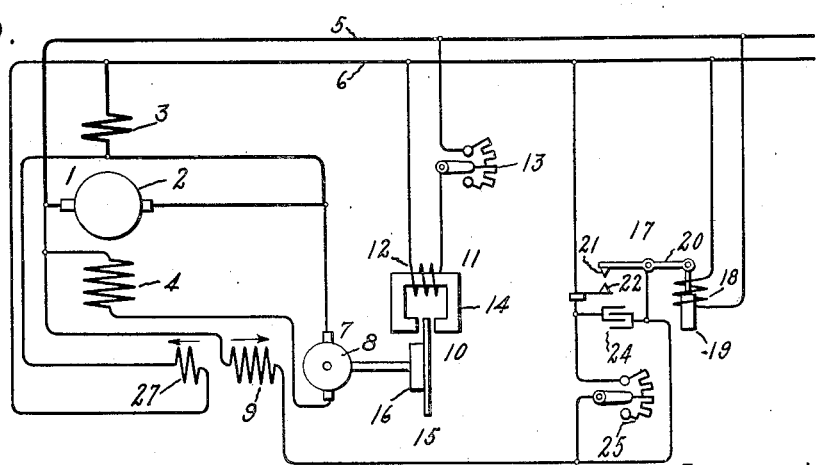
Inventor:
Louis W. Thompson,
by Albert G. Davis
His Attorney.

L. W. THOMPSON.
AUTOMATIC REGULATING SYSTEM.
APPLICATION FILED OCT. 25, 1919.

1,365,566.

Patented Jan. 11, 1921.
4 SHEETS—SHEET 2.

Inventor:
Louis W. Thompson,
by Albert E. Davis
His Attorney.

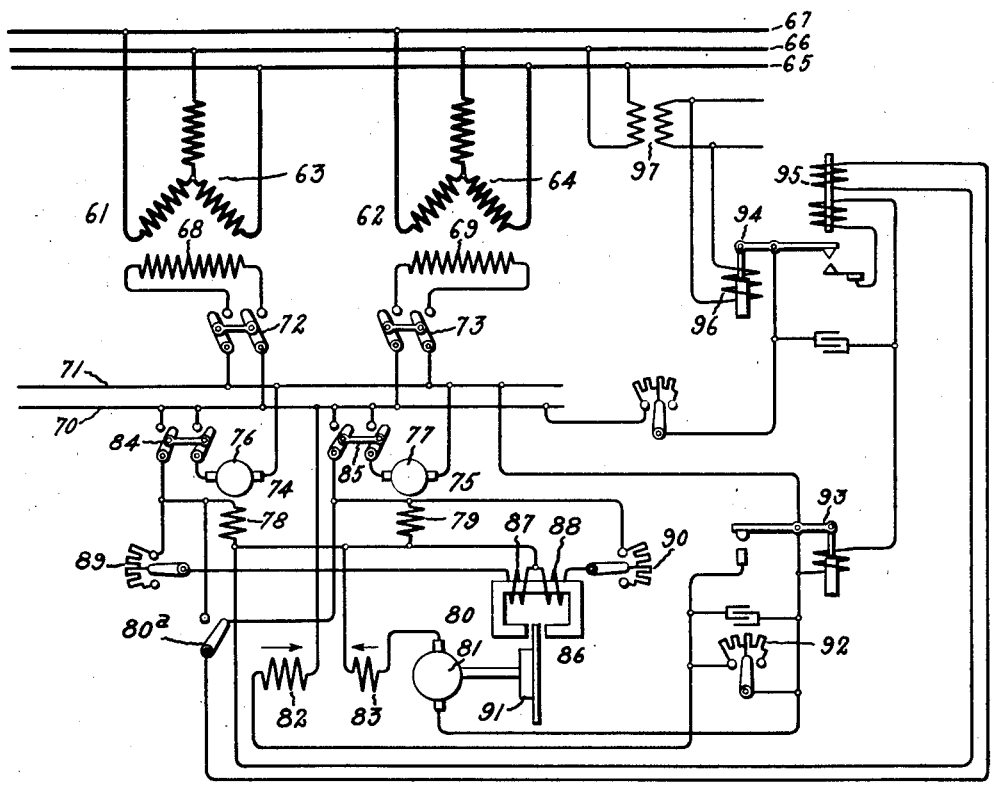

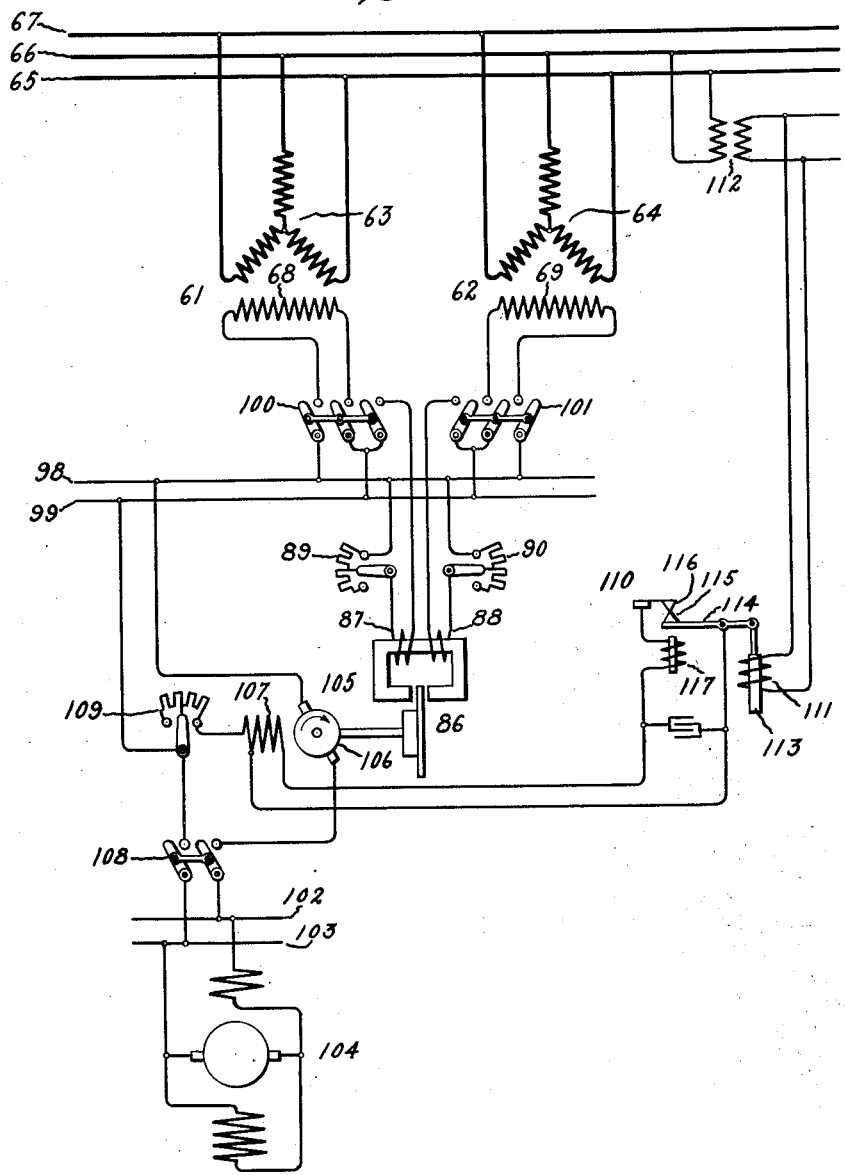

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

AUTOMATIC REGULATING SYSTEM.

1,365,566.  Specification of Letters Patent.  Patented Jan. 11, 1921.

Application filed October 25, 1919. Serial No. 333,263.

*To all whom it may concern:*

Be it known that I, LOUIS W. THOMPSON, a citizen of the United States, residing at Schenectady in the county of Schenectady, State of New York, have invented certain new and useful Improvements in Automatic Regulating Systems, of which the following is a specification.

My invention relates to automatic regulating systems in which a dynamo electric machine is arranged to control by its counter-electromotive force, the current in the circuit to be regulated, or the current in a circuit, the control of which determines the electrical condition of the circuit to be regulated, as for example, the current in the field circuit of a dynamo electric machine, or its exciter, which current determines the voltage of the dynamo electric machine.

An object of my invention is to provide a regulating arrangement which is accurate in operation and quickly responsive to changes in the electrical condition of the system to be regulated, while at the same time free from any tendency to produce pulsations in the electrical condition being regulated. A further object is to produce a regulating arrangement which is adapted to operate under conditions of widely and rapidly fluctuating load. A further object is to produce a regulating arrangement which is reliable in operation and with which a dangerously high voltage cannot be produced in the system, even if the controlling contacts of the regulator stick and render the regulating arrangement inoperative.

This application is a continuation in part of my earlier filed applications Serial Nos. 221,046 and 221,047 filed March 7, 1918, all of the subject matter in said prior applications being incorporated in this application, together with certain additional subject matter.

Figure 4:
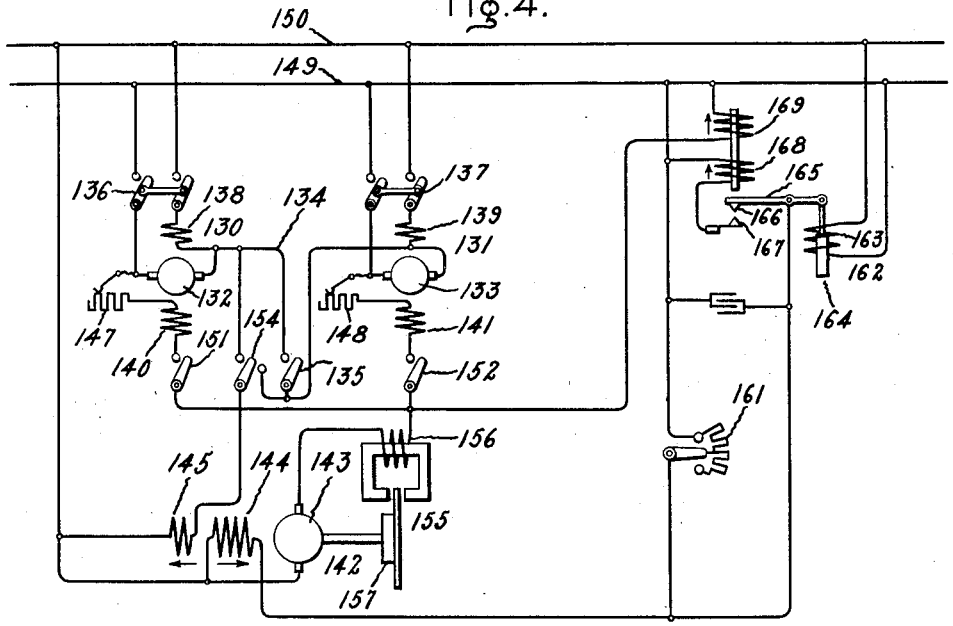
Figure 5:
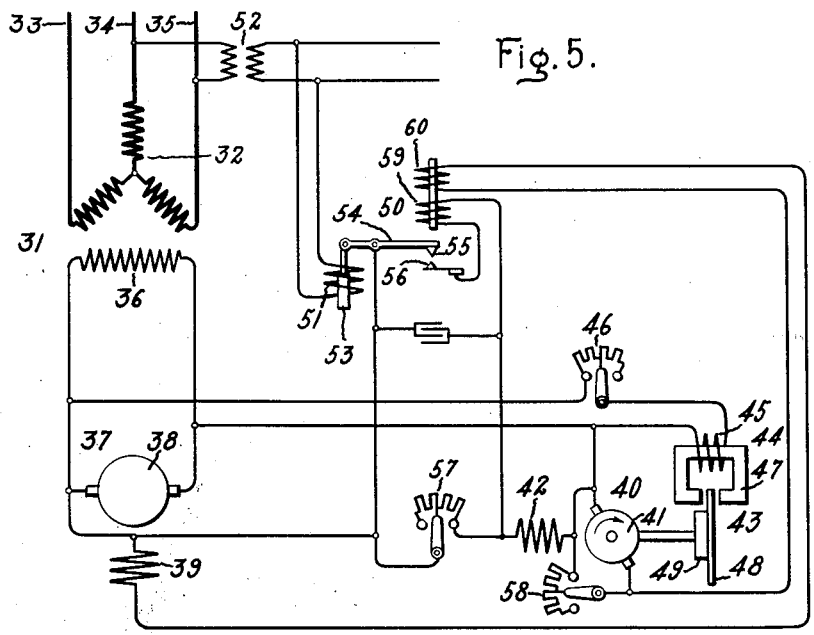

My invention may best be explained by referring to the accompanying drawings, Figures 1, 2 and 3 of which show diagrammatically modifications of my invention embodied in regulating systems for direct current generators; Fig. 4 of which shows diagrammatically a modification of my invention embodied in a regulating system for a plurality of compound-wound direct current generators connected in multiple; Fig. 5 of which shows diagrammatically a modification of my invention embodied in a regulating system for an alternating current generator; Fig. 6 of which shows diagrammatically a modification of my invention embodied in a regulating system for one or more alternating current generators which are adapted to be excited from one or more exciters; and Fig. 7 of which shows diagrammatically a modification of my invention embodied in a regulating system for one or more alternating current generators which are adapted to be excited from a substantially constant voltage source of current.

Referring to Figs. 1, 2 and 3 of the drawing, wherein are shown regulating systems for direct current generators and wherein similar parts are designated by similar characters, 1 represents a direct current generator having an armature 2, a series field winding 3 and a shunt field winding 4. The generator 1 is connected to supply current to the mains 5 and 6. 7 represents a motor having an armature 8, connected in series with the shunt field winding 4 of the generator 1, and a main field winding 9. 10 represents a brake of the magnetic drag type comprising a field member 11 having an energizing winding 12, connected in series with an adjustable resistance 13, and a core 14, between the poles of which is located an armature 15 consisting of a disk of conducting material which is connected to rotate with the armature 8. In Fig. 1 the energizing coil 12 is shown as being connected across the terminals of the shunt field winding 4 and in Figs. 2 and 3 as being connected across the mains 5 and 6. With the connection shown in Fig. 1 the counter-torque of the brake 10 increases with the speed and with the load, as the field current of the generator increases with the load, whereas with the connections shown in Figs. 2 and 3 the counter-torque of the brake 10 increases only with the speed as the voltage across the mains remains approximately constant. Although the magnetic drag brake, which is illustrated and described, has been found to give very satisfactory results, it is not essential to the satisfactory operation of my invention that this particular type of brake be employed but numerous other types of brakes which are adapted to oppose the rotation of the motor with a counter-torque which does not decrease with an increase in speed may be used with success. 16 represents a fly-wheel connected to rotate with the armature 8 of the motor 7 and the armature 15 of the brake 10. The function of this fly wheel is to prevent sudden changes, while permitting gradual changes, in the speed of the motor. Obviously, however, the same result can be obtained by designing some part of the rotating element of the motor, such as the armature 8 or the armature 15, or both, to have the necessary fly-wheel effect, in which event the fly-wheel 16 can be dispensed with. 17 represents a vibratory device having a winding 18, connected across the mains 5 and 6, a movable core 19, a movable arm 20, connected to be actuated by said core, a movable contact 21, carried by said arm and a stationary contact 22, coöperating with the movable contact 21. A condenser 24 is preferably connected between the movable contact 21 and the stationary contact 22 in order to reduce sparking. In Figs. 1 and 2, the stationary contact 22 is connected through the field winding 9 of the motor 7, to the main 5 and the movable contact 21 is connected, through an adjustable resistance 23, to the main 6. In Fig. 3 the field winding 9 is connected, in series with an adjustable resistance 25, across the mains 5 and 6 and the contacts 21 and 22 are connected to the terminals of the resistance 25. In Fig. 1 the brushes of the motor 7 are shown displaced in a direction opposite to the direction of the motor rotation, the direction of the motor rotation being indicated by an arrow on the armature 8. Due to the location of the brushes, a portion of the armature winding develops a magnetomotive force opposing the magnetomotive force of the field winding 9. The value of the magnetomotive force which opposes the magnetomotive force of the field winding 9 may be increased to the desired degree by increasing the displacement of the brushes. In Fig. 2, instead of having the armature winding develop the opposing magnetomotive force, a differential series field winding 26, connected in series in the armature circuit, constitutes the means for developing a magnetomotive force opposing the magnetomotive force of the field winding 9. In Fig. 3 the winding 27, which is connected across the series field winding 3, so as to act differentially with respect to the field winding 9, constitutes the means for developing a magnetomotive force opposing the magnetomotive force of the field winding 9. Instead of connecting the winding 27 across the series field winding 3, it may be connected in any manner such that the current therein will vary in accordance with the current output of the generator 1. The effect of the magnetomotive force, opposing the magnetomotive force of the field winding 9, upon the operation of the several modifications will be explained hereinafter.

The operation of the modification illustrated in Fig. 1 as at present understood, is as follows:

When starting the generator 1, assuming the voltage, if any, across the mains 5 and 6 to be low, the motor 7 will be at a standstill, no counterelectromotive force will oppose the flow of current in the field winding 4, and hence the voltage of the generator 1 will build up rapidly. When the voltage across the mains 5 and 6 reaches a predetermined value, the core 19 of the vibratory device 17 will be raised by reason of the increased energization of the winding 18 and the movable contact 21 will be caused to engage with the stationary contact 22. Thereupon the field winding 9 will be energized, the motor 7 will begin to rotate in the direction of the arrow, and its rotation will be opposed by the brake 10, whose braking counter-torque varies as a function of the speed of the motor and of the generator excitation. By connecting the energizing winding 12 of the brake 10 so that the energizing current therefor, in addition to the field current, flows through the armature 8, the motor will begin to revolve at a lower field current value than if only the field winding were connected to the armature 8. This is of very great importance where it is desired to regulate small machines at very light loads, as under such conditions the field current is apt to be so small that it could not run the motor and consequently the desired regulation could not be obtained. This connection also has the advantage that as the field current increases, the braking effect of the brake 10 is increased. The displacement of the brushes is preferably adjusted so that the torque due to the opposing magnetomotive force developed in the armature and which tends, when the field winding 9 is deënergized, to rotate the motor in a direction opposite to that indicated by the arrow, is insufficient to start the motor from rest. The rate of rotation of the motor 7 in the direction of the arrow will gradually increase and an increasing counter-electromotive force will oppose the flow of current in the field winding 4, thereby decreasing the voltage of the generator 1. Upon the voltage across the mains 5 and 6 falling below said predetermined value, the core 19 of the vibratory device 17 moves downward and raises the movable contact 21 out of engagement with the stationary contact 22. The field winding 9 will thereupon be deënergized and consequently the counter electromotive force opposing the flow of current in the field winding 4 will decrease, thereby increasing the voltage of the generator 1. The magnetomotive force developed by the portion of the motor armature winding in opposition to the magnetomotive force of the field winding 9, hastens the building down of the motor field flux upon the deënergization of the field winding 9, lowers the minimum flux value, and may in some cases even reverse the direction of flux for brief periods. If the flux be reversed, the armature through its continued rotation caused by the fly-wheel effect of the rotating parts, will develop a boosting electromotive force. Since the current through the motor armature winding increases as the motor field flux decreases, the demagnetizing magnetomotive force thereof is greater when the field winding 9 is deenergized than when the field winding 9 is energized. When the voltage across the mains 5 and 6 again reaches said predetermined value, the field winding is again energized and the cycle of operation repeated. The operation during one vibration of the device 17 has been described as though it were independent of other vibrations, but it will be understood that, in normal operation, the contact 21 vibrates rapidly and, when the voltage across the mains 5 and 6 is above said predetermined value, the contacts 21 and 22 will be in engagement, and the field winding 9 be energized, a greater portion of the time than when the voltage across the mains 5 and 6 is below said predetermined value and that the counter electromotive force of the motor 7 will be varied, in response to a departure of the voltage of the generator 1 from said predetermined value, in such a way as to maintain the voltage substantially at said value. Since the energization of the field winding 4 is controlled by the electromotive force developed by the motor 7, which in turn is controlled by the vibratory device 17, rather than directly by a vibratory device, the variations in the energization of the field winding 4 are not abrupt, and hence fluctuations in the voltage across the mains 5 and 6, due to vibrations of the vibratory device 17 are avoided.

This is of particular importance where incandescent lamps, which will flicker if slight fluctuations occur in the voltage impressed thereon, are supplied from the mains 5 and 6. Sudden changes in the speed of the motor due to variations in its field or armature current are prevented by the inertia or fly-wheel effect of the rotating parts while gradual changes in the speed are limited and controlled by the brake 10, which opposes the rotation of the motor with a counter-torque varying as a function of the motor speed and of the excitation of the generator. Racing of the motor upon variations of its excitation is thus prevented in a simple and efficient manner and the regulating operation thereof is rendered safe and reliable over its entire speed range.

Since the braking effect produced by the energizing coil of the brake tends, with an increase in load, to slow down the motor, a larger motor field current is required in order to develop the necessary counter electromotive-force than if the current through the energizing coil remained constant. Consequently a smaller change in the rate of vibration of the vibratory device is required to produce the desired change in the counter-electromotive force of the motor as the load increases, and therefore the brake tends to prevent the regulator from producing pulsations in the voltage on heavy loads, due to the slow rate of vibration of the vibratory device.

The operation of the modification illustrated in Fig. 2 is substantially the same as that of the modification illustrated in Fig. 1 which has already been described. In this modification, however, the means for developing a magnetomotive force opposing the magnetomotive force of the motor field winding 9 comprises a series differential field winding 26. It should be noted also that the counter-torque of the brake varies only as the function of the speed, because the energizing winding 12 is connected across the mains 5 and 6, the voltage of which remains substantially constant. Therefore the braking effect produced by the energizing winding does not have the tendency to prevent pulsations in the voltage that the connection shown in Fig. 1 does. It is obvious however that the connection shown in Fig. 1 could be used in Fig. 2 to accomplish this result if it were so desired. The operation of the modification illustrated in Fig. 3 is substantially the same as the operation of the modification illustrated in Fig. 1. In this modification, however, the vibratory device 17 controls a short circuit around a resistance 25, which is connected in series with its field winding 9 of the motor 7, while the means for developing a magnetomotive force opposing the magnetomotive force of the field winding 9 comprises a differential field winding 27 connected across the series field winding 3. The energization of the differential field winding 27, will, therefore, vary with the current delivered by the generator 1 so that, if the current supplied by the generator 1 suddenly increases, the winding 27 will tend to decrease the counter-electromotive force of the motor 7 and thereby increase the current flowing in the field winding 4 and the voltage of the generator 1, whereas if the current supplied by the generator 1 suddenly decreases the winding 27 will tend to increase the counter-electromotive force of the motor 7 and thereby decrease the current flowing in the field winding 4 and the voltage of the generator 1. The winding 27, therefore, when connected to be energized in accordance with the current supplied by the generator 1, operates to regulate the voltage of the generator 1, in response to variations in current tending to produce voltage fluctuations. The field winding 27 also hastens the building down of the field flux upon the deënergization of the field winding 9, lowers the minimum flux value, and may in some cases even reverse the direction of flux for brief periods. Since the generator 1 is required to generate a higher voltage, in order to maintain a given voltage across the mains 5 and 6, when supplying a heavy current than when supplying a light current, it will be obvious that the greater differential effect of the winding 27 in the former case than in the latter case is beneficial. Furthermore it will be noted that with an increase in load, a smaller change in the field current through the main field winding 9 is required to produce the desired change in the counter-electromotive force than if the differential field winding is not used and therefore, the differential winding tends to prevent the regulator from producing pulsations in the voltage on heavy loads due to the slow rate of vibration of the vibratory device. The modification of Fig. 3 is particularly suited to systems wherein the generator is required to supply both a lightening load and a fluctuating motor load.

Referring to Fig. 4 wherein is shown a regulating system for a plurality of direct current generators adapted to be operated singly or in parallel, 130 and 131 represent direct current generators having armatures 132 and 133, series field windings 138 and 139, and shunt field windings 140 and 141. 142 represents a motor having an armature 143, a main field winding 144 and a differential field winding 145. Corresponding terminals of the shunt field windings 140 and 141 are connected together by means of switches 151 and 152 and are adapted to be connected through a brake coil 156, armature 143 of the motor 142 to the main 150 to which corresponding terminals of the armatures 132 and 133 are adapted to be connected, through the series fields 138 and 139 and the right hand blades of switches 136 and 137. These armature terminals are preferably connected together by the equalizer conductor 134 when switch 135 is closed. The other terminals of the armatures 132 and 133 and the shunt field windings 140 and 141 may be connected to the main 149 by means of the left hand blades of switches 136 and 137, adjustable resistances 147 and 148 being inserted in series with the shunt fields 140 and 141.

The armature of the motor 142 is provided with a brake 155 which is similar in all respects to the brakes shown in Figs. 1 to 3 inclusive except that the energizing winding 156 is adapted to be connected in series with either or both of the shunt field windings 140 and 141 depending upon whether the generators 130 and 131 are connected to the mains 149 and 150 and switches 151 and 152 are closed. One terminal of the differential winding 145 is connected to the main 150 and the other terminal is adapted to be connected by the double throw switch 154, to either side of the switch 135 in the equalizer conductor 134 so that upon closing either or both of the switches 136 and 137, the current in the differential field will vary in accordance with the current output of either or both of the generators. 157 represents a flywheel which is connected to rotate with the armature of the motor 142. The field winding 144 of the motor is connected in series with an adjustable resistance 161 across the mains 149 and 150. 162 represents a vibratory device having a winding 163 connected across the mains 149 and 150, a movable core 164, a movable arm 165 connected to be actuated by said core, a movable contact 166 carried by said arm, and a stationary contact 167 coöperating with the movable contact 166. One terminal of the resistance 161 is connected to the movable contact 166 and the other terminal of the resistance 161 is connected in series with an anti-hunting coil 168, associated with the vibratory device 162, to the stationary contact 167. The anti-hunting winding 168 is preferably mounted on a core, upon which is also wound a compensating winding 169 adapted to be connected across the terminals of either or both of the shunt field windings 140 and 141. The windings 168 and 169 are wound so as to assist each other and coöperate with the movable arm 165 to prevent undercompounding of the generators in a manner hereinafter described.

The operation of the modification illustrated in Fig. 4 is believed not to require a detailed description other than to point out wherein it differs from the modification shown in Fig. 3. It will be noted that the vibratory device 162 is provided with an anti-hunting winding 168 which is energized each time the resistance 161 is short circuited by the engagement of the contacts 166 and 167. The anti-hunting winding 168, when energized, attracts one end of the movable arm 165, which is of magnetic material, thereby tending to disengage the contacts 166 and 167. The winding 168 therefore causes a rapid vibration of the movable arm 165 independently of the variations in the voltage of the mains 149 and 150 and prevents hunting which would occur by reason of the time lag of the system, if no such device were provided. Due to the fact, however, that as the loads on the generators increase, the field currents thereof also have to be increased to maintain the predetermined value of voltage across the mains 149 and 150. In order to obtain this increase in field current, the rate of vibration of the movable arm 165 has to decrease so as to decrease the motor field current which in turn decreases the counter electromotive force of the motor. This decrease in the rate of vibration of the movable arm 165 however, decreases the average effect of the coil 168 and therefore a lower voltage will be able to move the movable contact into engagement with contact 167, so that the anti-hunting coil 168 will tend to cause under-compounding. This effect is much greater when the generators are operated well up on their saturation curves, because at such times a much larger change in the rate of vibration of the movable contact is necessary to produce a given variation in the field excitation of the generators than when the generators are operating on the straight portion of their magnetization curves. To compensate for this under-compounding effect, due to change in load, the winding 169 is employed. This winding 169 is adapted to be connected by switches 151 and 152 so that it is traversed by current which varies in accordance with the current in the field winding of the generator being operated when only one of them is being operated and in accordance with changes in the current in both field windings when the generators are being operated in parallel, and tends through its coöperation with the movable arm, to disengage the contacts 166 and 167. Consequently, when a heavy current traverses the field windings of the generators, due to an increase in load, the winding 169 will modify the action of the vibratory device 162 and tend to maintain the contacts 166 and 167 open a greater portion of the time thereby decreasing the counter-electromotive force of the motor 142 and further increasing the current traversing the field windings 140, and 141, thereby compensating for the tendency of winding 168 to cause a lower voltage to be held during conditions of heavy loads. It will be noted that the differential winding 145 of the motor 142 is connected across the terminals of the series field windings 138 and 139 and operates in substantially the same manner as the differential winding 27, with which the motor 7 shown in Fig. 3 is provided.

It will also be noted that the winding 156 is adapted to be connected in series with either or both of the shunt field windings 140 and 141 so that it can be energized in accordance with the current in the shunt field windings of the generator being operated, when only one of them is being operated, and in accordance with changes in the current in both field windings when the generators are being operated in parallel, and therefore tends to prevent the regulator from producing pulsations in the voltage on heavy loads due to the slow rate of vibration of the vibratory device.

Referring to Fig. 5 wherein is shown a regulating system for an alternating current generator, 31 represents an alternating current generator, having an induced winding 32, connected to supply current to the mains 33, 34 and 35, and an inducing winding 36, connected to be energized by an exciter 37. The exciter 37 comprises an armature 38 and a shunt field winding 39. 40 represents a motor having an armature 41, connected in series with the shunt field winding 39 of the exciter 37, and a field winding 42. 43 represents a brake of the magnetic drag type comprising a field member 44, having an energizing winding 45, connected in series with the adjustable resistance 46 across the armature 38 of the exciter 37, and a core 47, between the poles of which is located an armature 48, which consists of a disk of conducting material connected to rotate with the armature 41. 49 represents a fly-wheel connected to rotate with the armature 41 and the armature 48. 50 represents a vibratory device having a winding 51, connected to the mains 34 and 35 by means of the potential transformer 52, a movable core 53 a movable arm 54, connected to be actuated by said core, a movable contact 55 carried by said arm, and a stationary contact 56 coöperating with the movable contact 55. The motor field winding 42 is connected in series with the adjustable resistance 57 across the armature of the exciter 37. One terminal of the resistance 57 is connected to the movable contact 55 of the vibratory device 50 and the other terminal of the resistance 57 is connected in series with an anti-hunting winding 59, associated with the vibratory device 50, to the stationary contact 56.

An adjustable resistance 58, may, if desired, be connected across the armature 41 in order to vary the portion of the field current of the exciter traversing the armature 41. The exciter field winding 39 is connected in series with a compensating winding 60, associated with the vibratory device 50, and the armature 41 of the motor 40 across the armature of the exciter 37. The windings 59 and 60 are preferably mounted upon a core and coöperate with the movable arm 54 in the same manner and for the same purpose as windings 168 and 169 in Fig. 4.

Referring to Fig. 6, wherein is shown a regulating system for one or more alternating current generators comprising a plurality of exciters adapted to be operated singly or in parallel, 61 and 62 represent alternating current generators having induced windings 63 and 64 connected to supply current to the mains 65, 66 and 67, and inducing windings 68 and 69, adapted to be connected to exciter buses 70 and 71 by means of the switches 72 and 73. 74 and 75 represent exciters having armatures 76 and 77 and shunt field windings 78 and 79. 80 represents a motor having an armature 81, a main field winding 82, and a differential series field winding 83. Corresponding terminals of the exciter field windings 78 and 79 are connected through the armature 81 of the motor 80 to the bus 71 to which are also connected corresponding terminals of the armatures 76 and 77. The other terminals of the armatures 76 and 77 and of the field windings 78 and 79 may be connected to the bus 70 by means of the switches 84 and 85. The armature of the motor 80 is provided with a brake 86 which is similar in all respects to the brake 43 shown in Fig. 4 except that it is provided with two energizing windings 87 and 88, the former of which is connected through an adjustable resistance 89 across the field winding 78 of the exciter 74, and the latter of which is connected through an adjustable resistance 90 across the field winding 79 of the exciter 75, so that if only one of said exciters be supplying current to the buses 70 and 71, only one of the windings 87 and 88 will be energized whereas both of said windings 87 and 88 will be energized when both of said exciters are supplying current to the buses 70 and 71. 91 represents a fly-wheel which is connected to rotate with the armature of the motor 80. The field winding 82 of the motor 80 is connected, in series with an adjustable resistance 92, across the buses 70 and 71. The effectiveness of the resistance 92 is varied by means of a relay 93 the operation of which is controlled by a vibratory device 94. The vibratory device 94 is similar to the vibratory device 50, illustrated in Fig. 5, but the winding 95, corresponding to the winding 60, is connected in shunt to the exciter field winding 78, or exciter field winding 79 or both depending upon the position of the switches 80ª, 84 and 85. The vibratory device 94 is provided with a winding 96 which corresponds to the winding 51 in Fig. 5 and is connected through a potential transformer 97 to the mains 65 and 66.

Referring to Fig. 7 wherein is shown a regulating system for a plurality of alternating current generators adapted to be operated single or in parallel and to be excited from an exciter or other source of current, the voltage of which remains substantially constant, 61 and 62 represent alternating current generators having induced windings 63 and 64, connected to supply current to the mains 65, 66, and 67, and inducing windings 68 and 69. 98 and 99 represent buses to which the inducing windings 68 and 69 are adapted to be connected by means of the three pole switches 100 and 101. 102 and 103 represent buses which are adapted to be supplied with current at a substantially constant voltage by means of a generator 104 or any source of current.

105 represents a motor having an armature 106 and a field winding 107. The bus 98 is adapted to be connected to the bus 102 through the armature 106 and the right hand blade of the double pole switch 108 while the bus 99 is adapted to be connected to the bus 103 through the left hand blade of the switch 108. The field winding 107 of the motor 105 is connected in series with an adjustable resistance 109 across the buses 102 and 103 when the switch 108 is closed. The motor 105 is provided with a brake 86 which is similar in all respects to the brake similarly designated in Fig. 6 except that the energizing winding 87 is connected in series with the adjustable resistance 89 across the buses 98 and 99 when the switch 100 is closed and the energizing winding 88 is connected in series with the adjustable resistance 90, across the buses 98 and 99 when the switch 101 is closed. The energization of the field winding 107 of the motor 105 is controlled by the vibratory device 110 having a winding 111 connected to the mains 65 and 66 by means of the potential transformer 112, a movable core 113, a movable arm 114 connected to be actuated by said core, a movable contact 115 carried by said arm, and a stationary contact 116 coöperating with the movable contact 115. The movable contact 115 is electrically connected to an intermediate tap on the motor field winding 107 and the stationary contact 116 is connected in series with a winding 117 associated with the vibratory device 110, to one terminal of the field winding 107 so that, upon the engagement of the contacts 115 and 116, a portion of the field winding 107 is short circuited. The winding 117, associated with the vibratory device 110, is mounted upon a core and operates with the movable arm 114 in a manner and for a purpose hereinafter described.

The operation of the modification illustrated in Fig. 5 as at present understood, is as follows:

Since the operation in starting is substantially like that of the modification shown in Fig. 1, which has already been described, let it be assumed that the alternating current generator 31 is in operation and that its field winding 36 is energized to an extent just sufficient to cause it to maintain the desired predetermined voltage across the mains 34 and 35. The vibratory device 50 will then be in operation and the period, during which the coöperating contacts 55 and 56 are engaged, will bear such a relation to the period, during which they are disengaged, that the counter-electromotive force of the motor 40 will maintain, through its control of the energization of the exciter winding 39, the energization of the inducing winding 36 of the alternating current generator 31 at the proper value. It will be noted that, upon the engagement of the contacts 55 and 56, the resistance 57 in series with the motor field winding 42 is short circuited and at the same time the anti-hunting winding 59 is energized. The anti-hunting winding 59, therefore causes a rapid vibration of the movable arm 54 independently of the variations in the voltage of the mains 34 and 35 and prevents hunting which would occur, by reason of the time lag of the system, if no such device were provided. If the voltage of the mains 34 and 35 increases above the aforesaid predetermined value, the contacts 55 and 56 will be in engagement a greater portion of the time, thereby increasing the counterelectromotive force of the motor 40 and hence decreasing the voltage of the exciter 37 and consequently the voltage of the generator 31. Similarly if the voltage across the mains 34 and 35 decrease below the aforesaid predetermined value, the contacts 55 and 56 will be in engagement a less portion of the time and consequently the counterelectromotive force of the motor 40 will be decreased thereby increasing the voltage of the exciter 37 and consequently the voltage of the generator 31. Hence the operation of the vibratory device 50 is modified, upon a slight variation of the voltage across the mains 34 and 35 from said predetermined value, so as to maintain the generator voltage substantially constant. In this modification the energizing winding 45 of the brake 43 is connected across the exciter armature 31 with the result that when the current traversing the armature 31 of the motor 40 is high, and consequently when the voltage of the exciter 37 is high, the braking effect of the brake 43 is increased. As the load on the generator increases, the anti-hunting winding 59 causes an undercompounding of the generator in the same manner that the anti-hunting winding 168 in Fig. 4 causes an undercompounding of the generators 130 and 131. To compensate for this under-compounding effect the winding 60, associated with the vibratory device 50, is employed. This winding 60 is traversed by the current which energizes the field winding of the exciter and tends, through its coöperation with the movable arm 54, to disengage the contacts 55 and 56. Consequently, when a heavy current traverses the exciter field winding 39, the winding 60 will modify the action of the vibratory device 50 and tend to maintain the contacts 55 and 56 open a greater portion of the time thereby decreasing the counter electromotive force of the motor 40 and further increasing the current traversing the exciter field winding 39. It will be noted that the brushes of the motor 40 are displaced from neutral position in a direction opposite to the direction of rotation of the motor 40, which is indicated by the arrow upon the armature 41. The effect of such displacement has already been described in connection with the description of the modification shown in Fig. 1.

The operation of the modification illustrated in Fig. 6 is believed not to require a detailed description other than to point out wherein it differs from the modification shown in Fig. 5. It will be noted that the vibratory device 94 is provided with a winding 95 which corresponds in function with the winding 60, associated with the vibratory device 50 in Fig. 5 and which is adapted to be connected in multiple to the field winding 78 of the exciter 74 or the field winding 79 of exciter 75 depending upon the position of the switch 80$^a$. If it be necessary to operate only one of the exciters, the switch 80$^a$ should therefore, be properly adjusted so that the winding 60 is connected in multiple to the field winding of the exciter being operated. In this modification it will also be noted that a relay 93 is interposed between the vibratory device 94 and the resistance 92 which is controlled thereby. The currents traversing the field winding 78 and 79 both traverse the armature 81 of the motor 80. The brake 86 is provided with two energizing windings 87 and 88, connected across the field windings 78 and 79, respectively, so that the brake 86 will exert a braking counter-torque varying as a function of the currents traversing the windings 78 and 79, and, consequently, as a function of the current traversing the armature 81. The motor 80 is provided with a differential series field winding 83 which operates in substantially the same manner as the differential series field winding 26, with which the motor 7 shown in Fig. 2 is provided.

The operation of the modification illustrated in Fig. 7 is substantially similar to that of the modification shown in Fig. 6. In this modification, however, the armature 106 of the motor 105 is traversed by the currents supplied to the field windings 68 and 69 of the alternating current generators 61 and 62 and the counter electromotive force of the motor 105, which controls the energization of the field windings 68 and 69, is varied by connecting the vibratory device 110 so as to short circuit a portion of the field winding 107. In this modification no winding, corresponding to the winding 60 associated with the vibratory device in Fig. 5 is employed. Furthermore, the energizing windings 87 and 88 of the brake 86 are connected across the buses 98 and 99, upon closing of the switches 100 and 101 so that the brake 86 will exert a braking effect which is a function of the current traversing the armature 106 of the motor 105.

While I have herein shown and described several modifications and applications of my invention I do not desire to be limited to the exact arrangement shown and described but seek to cover in the appended claims all those modifications and applications which come within the true spirit and scope of my invention.

What I claim as new and desire to secure by Letters Patent of the United States, is:

1. In combination a circuit to be regulated, a source of supply therefor, a motor arranged to regulate said circuit by its counter electromotive force, a brake for opposing the rotation of said motor, and vibratory means for varying the excitation of said motor in accordance with an electrical condition of the circuit to be regulated.

2. The combination with a dynamo electric machine, of regulating means therefor comprising a motor connected to control by its counter electromotive force the excitation of said machine, a brake for opposing the rotation of said motor with a counter-torque varying as a function of the motor speed, and vibratory means responsive to an electrical condition of said machine for varying the energization of said motor field winding.

3. In combination, a circuit to be regulated, a source of supply therefor, a motor arranged to regulate said circuit by its counter electromotive force, the rotating element of said motor being designed to prevent sudden changes in the speed thereof, a brake for opposing the rotation of said motor, and vibratory means for varying the excitation of said motor in accordance with an electrical condition of the circuit to be regulated.

4. The combination with a dynamo electric machine of regulating means therefor comprising a motor connected to control by its counter-electromotive force the excitation of said machine, means comprising a flywheel for preventing sudden changes in the speed of said motor, a brake for opposing the rotation of said motor over its entire speed range, and vibratory means for varying the excitation of said motor.

5. In a system of distribution, a dynamo-electric machine having a field winding, of regulating means therefor comprising a motor provided with an armature connected in series with said field winding and with a field winding, vibratory means affected by an electrical condition of said system for varying the energization of said motor field winding, and a brake for opposing the rotation of said motor.

6. In combination a circuit to be regulated, a source of supply therefor, a motor provided with a field winding and an armature arranged to regulate said circuit by its counter electromotive force, means for varying the energization of said motor field winding, means for opposing the rotation of said motor, and connections whereby a winding of said machine develops a magnetomotive force opposing the magnetomotive force of said motor field winding.

7. The combination with a dynamo electric machine, of regulating means therefor comprising a motor provided with a field winding and an armature connected to control by its counter electromotive force the excitation of said machine, vibratory means for varying the energization of said motor field winding, means for opposing the rotation of said motor, and means comprising a differential field winding for developing a magnetomotive force opposing the magnetomotive force of said motor field winding.

8. The combination with a generator, of regulating means therefor comprising a motor connected to control by its counter-electromotive force the excitation of said generator, said motor being provided with a main field winding and with a differential field winding energized in accordance with the current output of said generator, means for opposing the rotation of said motor, and vibratory means responsive to an electrical condition of said generator for varying the energization of the main field winding of said motor.

9. The combination with a direct current generator having a shunt field winding and a series field winding, of regulating means therefor comprising a motor provided with an armature connected in series with said shunt field winding, with a main field winding, and with a differential field connected across a portion of said series field winding, the rotating element of said motor being designed to prevent sudden changes in the speed thereof, vibratory means responsive to an electrical condition of said generator for varying the energization of said motor main field winding, and means for opposing the rotation of said motor.

10. The combination with a dynamo electric machine of regulating means therefor comprising a motor provided with a field winding and an armature connected to control by its counter-electromotive force the excitation of said machine, vibratory means for varying the energization of said motor field winding, and means for opposing the rotation of said motor with a counter-torque varying as a function of an electrical condition of said machine.

11. The combination with a dynamo electric machine, of regulating means therefor comprising a motor provided with a field winding, and an armature connected to control by its counter-electromotive force the excitation of said machine, vibratory means for varying the energization of said motor field winding, and means for opposing the.

rotation of said motor with a counter-torque varying as a function of the excitation of said machine.

12. The combination with a dynamo electric machine having a shunt field winding, of regulating means therefor comprising a motor provided with a field winding and with an armature connected in series with said shunt field, vibratory means, responsive to an electrical condition of said machine for varying the energization of said motor field winding, and an electromagnetic brake for opposing the rotation of said motor, a winding of said brake being connected so as to be energized in accordance with the current through the shunt field winding of said machine.

13. In a system of distribution, a plurality of dynamo electric machines provided with armatures which are adapted to be connected in parallel, and with field windings, and means for regulating the voltage of said machines comprising a motor provided with an armature connected so as to be traversed by the currents traversing said field windings, and with a field winding, vibratory means for varying the energization of said motor field winding, and means for opposing the rotation of said motor, with a counter-torque which varies as a function of the current traversing said motor armature.

14. In combination, a circuit to be regulated, a source of supply therefor, a motor arranged to regulate said circuit by its counter-electromotive force, a brake for opposing the rotation of said motor, and vibratory means for varying the regulating effect of said motor in accordance with the electrical condition of the circuit to be regulated.

In witness whereof, I have hereunto set my hand this 24th day of October, 1919.

LOUIS W. THOMPSON.